No. 849,728. PATENTED APR. 9, 1907.
J. DINTAMAN.
DRINKING TROUGH.
APPLICATION FILED MAR. 26, 1906.
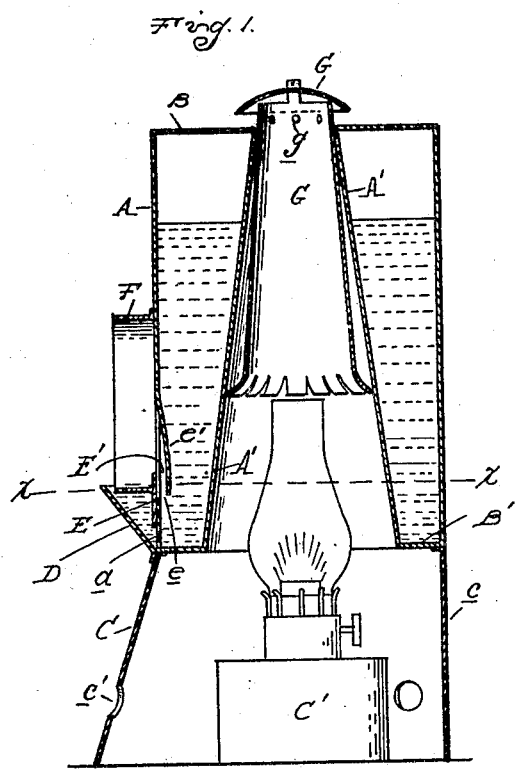
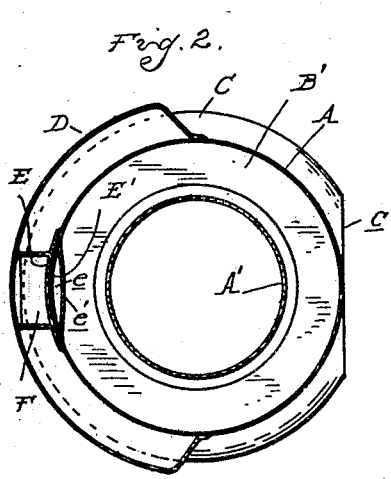
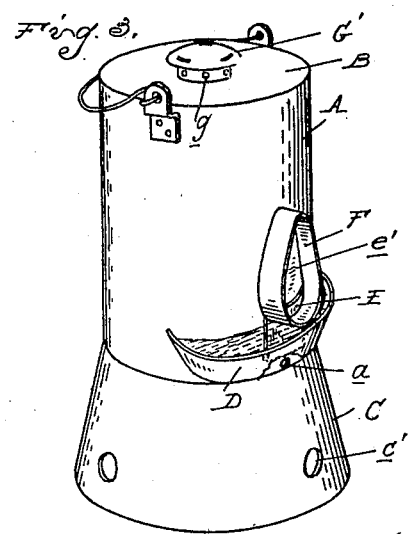
Witnesses
James P. Barry
Edward Ault
Inventor
Joseph Dintaman
By Whittemore, Hulbert & Whittemore
Att'ys.

UNITED STATES PATENT OFFICE.

JOSEPH DINTAMAN, OF ITHACA, MICHIGAN.

DRINKING-TROUGH.

No. 849,728.	Specification of Letters Patent.	Patented April 9, 1907.

Application filed March 26, 1906. Serial No. 308,029.

*To all whom it may concern:*

Be it known that I, JOSEPH DINTAMAN, a citizen of the United States of America, residing at Ithaca, in the county of Gratiot and State of Michigan, have invented certain new and useful Improvements in Drinking-Troughs, of which the following is a specification, reference being had therein to the accompanying drawings.

The invention relates to new and useful improvements in drinking troughs or fountains for poultry, and consists in an inexpensive and durable construction of trough and tank, as will be more fully hereinafter described, and set forth in the claims.

One object of my invention is to obviate the necessity of plugs and stoppers. It has been found by experience that plugs or stoppers are constantly leaking when in place or sticking when it is desired to remove them, and in winter it is difficult to keep them from freezing.

Another object of my invention is to provide an arrangement of tank in which a lamp or other heating means may be installed without danger of overheating and melting the solder. This overheating occurs frequently in the tanks now on the market, especially if the water is allowed to get low.

In the drawings, Figure 1 shows a vertical central section through the tank and trough. Fig. 2 is a horizontal section on lines $x$ $x$ of Fig. 1, and Fig. 3 is a perspective view of the tank and trough.

A is the tubular outer wall of the tank, and A' is a frusto-conical inner wall, the ends of the two being connected by the annular top and bottom B and B', respectively.

C is a supporting-base for the tank and forms an inclosure for the lamp C' or other suitable heating means. The base C is preferably flaring to give a broader supporting-base and is flattened at $c$ in order that the tank may be laid on its back without rolling.

D is a trough preferably extending half the distance around the lower end of the tank, and near the bottom of the trough are a series of apertures $a$ in the wall A, through which water can pass from the tank to the trough.

In the side opposite to the flattened portion $c$ of the base the wall A is slit at $e$ and the portion above the slit depressed at $e'$ and across the slit and the lower end of the depressed portion is soldered a plate E, thus forming an upwardly-extending channel E', through which the tank may be filled and emptied and through which air can pass into the tank as the trough is emptied below the level of the lower end of said channel. It will be seen that the water in the fill-channel will rise to a height sufficient to cover the lower end thereof, and the water in the trough will rise to the same level by reason of the communication through the apertures $a$. The lower end of the fill-channel is thus water-sealed and determines the depth of water in the trough. This depth will thus remain constant until the level of the water in the tank falls below the lower end of the fill-channel and permits air to enter the tank therethrough. The water in the tank and trough will then have common levels until they reach the lower rims of the apertures $a$.

F is a flange or rim soldered to the outside of the wall A around the channel-opening for the purpose of forming a funnel to assist in the filling operation.

G is a tubular or frusto-conical member having its lower end flared, whereby the member G is spaced from the wall A' and forms an air-jacket therefor, thus preventing overheating and melting the tank.

G' is a cover or top for the member G, said member being apertured at $g$ for the outlet of heated air and products of combustion from the heating means.

The base C is apertured at $c'$, and air can thus enter to furnish sufficient oxygen to support combustion, the member G serving as a flue for the lamp or other heating means.

It will be noted that the apertures $a$ are sufficiently above the bottom B' so that the water in the tank cannot be entirely exhausted, and thus the danger of running dry and melting out the bottom of the tank is averted.

What I claim as my invention is—

1. In a poultry drinking-fountain the combination with a tubular member having a central conical lining forming an annular water-receptacle and a central heating-chamber and an apertured supporting-base for said receptacle arranged to inclose the lamp, of a trough secured to said receptacle, and a covered tubular jacket member in said heating-chamber projecting above and spaced from the receptacle, said receptacle having a fill-aperture and an aperture in its lower end communicating with said trough.

2. In a poultry drinking-fountain, the combination with an annular tubular receptacle, the center of said annular receptacle forming a heating-chamber, of a trough on the outside of said receptacle, said receptacle having an aperture communicating with said trough and a downwardly-extending water-sealed fill-channel having its lower end terminating above said aperture, whereby the level of the water in said fill-channel determines the level of the water in said trough substantially as described.

In testimony whereof I affix my signature in presence of two witnesses.

JOSEPH DINTAMAN.

Witnesses:
A. E. BARSTOW,
A. P. LANE.